United States Patent
Wakabayashi et al.

(10) Patent No.: US 9,644,700 B2
(45) Date of Patent: May 9, 2017

(54) ENERGY-ABSORBING MEMBER AND METHOD OF PRODUCING SAME

(71) Applicant: Toray Industries, Inc., Tokyo (JP)

(72) Inventors: Hiroki Wakabayashi, Nagoya (JP); Yoshito Kuroda, Nagoya (JP); Yukitane Kimoto, Nagoya (JP)

(73) Assignee: Toray Industries, Inc. (JP)

( * ) Notice: Subject to any disclaimer, the term of this patent is extended or adjusted under 35 U.S.C. 154(b) by 171 days.

(21) Appl. No.: 14/423,752

(22) PCT Filed: Aug. 26, 2013

(86) PCT No.: PCT/JP2013/072671
§ 371 (c)(1),
(2) Date: Feb. 25, 2015

(87) PCT Pub. No.: WO2014/034585
PCT Pub. Date: Mar. 6, 2014

(65) Prior Publication Data
US 2015/0226281 A1    Aug. 13, 2015

(30) Foreign Application Priority Data

Aug. 27, 2012 (JP) .................................. 2012-186262

(51) Int. Cl.
*F16F 7/12*   (2006.01)
*B60R 19/18*   (2006.01)
*B32B 5/26*   (2006.01)
*B60R 19/03*   (2006.01)

(52) U.S. Cl.
CPC ............... *F16F 7/124* (2013.01); *B32B 5/26* (2013.01); *B60R 19/03* (2013.01); *B60R 19/18* (2013.01); *B32B 2260/021* (2013.01); *B32B 2260/046* (2013.01); *B32B 2262/106* (2013.01); *B60R 2019/186* (2013.01); *B60R 2019/1853* (2013.01); *Y10T 156/10* (2015.01); *Y10T 428/24124* (2015.01); *Y10T 442/30* (2015.04)

(58) Field of Classification Search
CPC ....................................................... F16F 7/124
USPC ....................................................... 428/113
See application file for complete search history.

(56) References Cited

FOREIGN PATENT DOCUMENTS

| | | |
|---|---|---|
| JP | 6-300067 | 10/1994 |
| JP | 6-307477 | 11/1994 |
| JP | 06307477 A * | 11/1994 |
| JP | 11-173358 | 6/1999 |
| JP | 11-280815 | 10/1999 |
| JP | 2003-56618 | 2/2003 |
| JP | 2006-200702 | 8/2006 |
| JP | 2008-232369 | 10/2008 |

* cited by examiner

*Primary Examiner* — Brent O'Hern
(74) *Attorney, Agent, or Firm* — DLA Piper LLP (US)

(57) ABSTRACT

An energy-absorbing member has a structure in which a plurality of fiber reinforced resin layers are layered in a thickness direction of said member and includes as the plurality of fiber reinforced resin layers, at least a plurality of unidirectional materials each including unidirectionally aligned reinforcing fibers and a resin and a plurality of cross materials each including a reinforcing fiber woven fabric and a resin, wherein lengths of the plurality of unidirectional materials in an external-loading direction are sequentially changed.

11 Claims, 2 Drawing Sheets

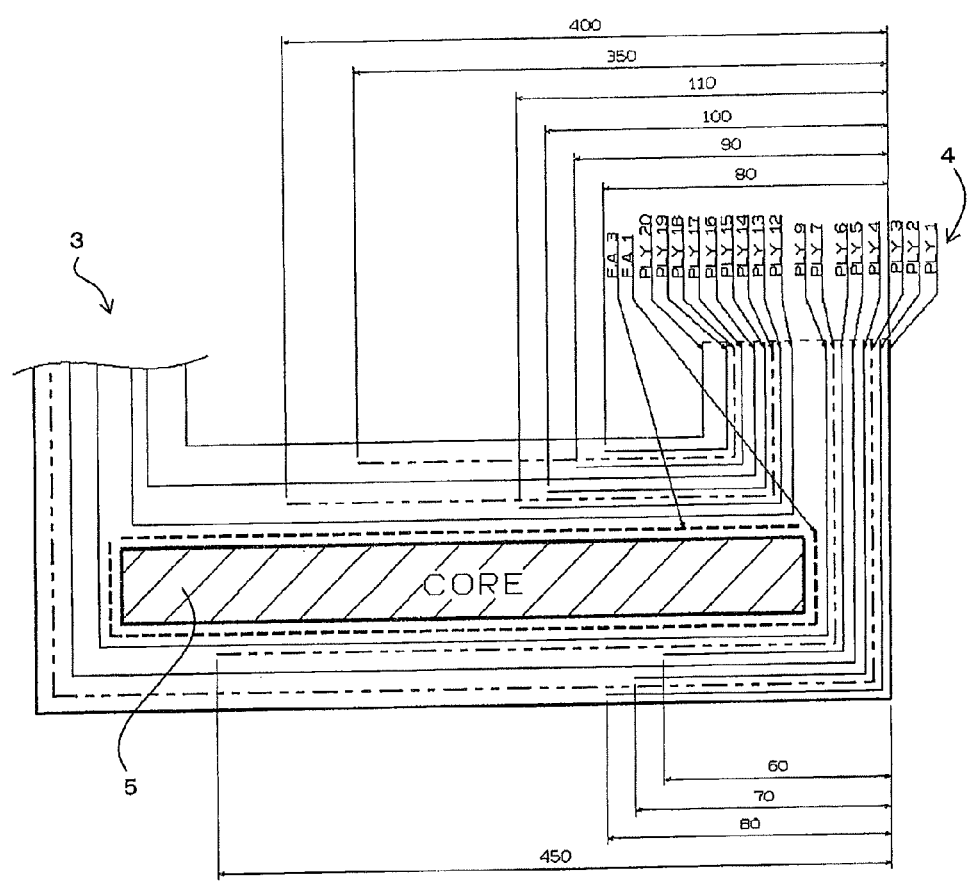

ENERGY-ABSORBING MEMBER AND METHOD OF PRODUCING SAME

TECHNICAL FIELD

This disclosure relates to an energy-absorbing member formed using a fiber reinforced resin and a method of producing the same and, specifically, to an energy-absorbing member capable of easily adjusting and setting an energy quantity to be absorbed at an optimum quantity, and a method of producing the same.

BACKGROUND

Various energy-absorbing members formed using a fiber reinforced resin, for example, a carbon fiber reinforced resin, are known. For example, JP-HEI 6-300067 and JP-HEI 6-307477 disclose an energy-absorbing member which can smoothly perform a breakage of a member for energy absorption by a specified layered structure of a plurality of fiber reinforced resin layers. Further, JP-HEI 11-280815 discloses an energy-absorbing body which can stabilize a load at the time of a member collapse and avoid an early collapse by, with respect to a plurality of fiber reinforced resin layers to be layered, controlling a ratio of a thickness of the layered portion to a number of layers in a specified range.

In any of such conventional technologies, although a plurality of fiber reinforced resin layers having different properties are layered at a predetermined formation or order, as the fiber reinforced resin layers to be layered, ones having substantially a same size or a same shape are used. Therefore, if the entire shape of the entire size of an energy-absorbing member to be made is decided, an energy quantity capable of being absorbed is within a certain limited range, and when it is required to absorb an energy quantity greatly out of the range, the design frequently becomes difficult.

In practice, however, for example, when an energy-absorbing member being attached to a vehicle front portion is designed, since an energy quantity to be absorbed at the time of collision greatly varies depending upon the weight of a vehicle body attached to the energy-absorbing member, if the kind of the vehicle changes, in accordance with the change it becomes necessary to newly design it each time.

Accordingly, it could be helpful to provide an energy-absorbing member capable of easily adjusting and setting an optimum energy absorption quantity in accordance with a target value without greatly changing an outward shape even when the target value of an energy quantity to be absorbed is required to be changed.

SUMMARY

We provide an energy-absorbing member having a structure in which a plurality of fiber reinforced resin layers are layered in a thickness direction of said member and including as said plurality of fiber reinforced resin layers, at least a plurality of unidirectional materials each including unidirectionally aligned reinforcing fibers and a resin and a plurality of cross materials each including a reinforcing fiber woven fabric and a resin, wherein lengths of said plurality of unidirectional materials in an external-loading direction are sequentially changed.

We further provide a method of producing an energy-absorbing member including layering a plurality of fiber reinforced resin layers in a thickness direction of said member, said plurality of fiber reinforced resin layers including at least a plurality of unidirectional materials each including unidirectionally aligned reinforcing fibers and a resin and a plurality of cross materials each including a reinforcing fiber woven fabric and a resin, wherein said plurality of unidirectional materials are sequentially layered with changing lengths of said plurality of unidirectional materials in an external-loading direction.

BRIEF EXPLANATION OF THE DRAWINGS

FIG. 3 is a schematic sectional view exemplifying a concrete sectional structure of a part 3 of FIG. 2.

EXPLANATION OF SYMBOLS

Figure 1:
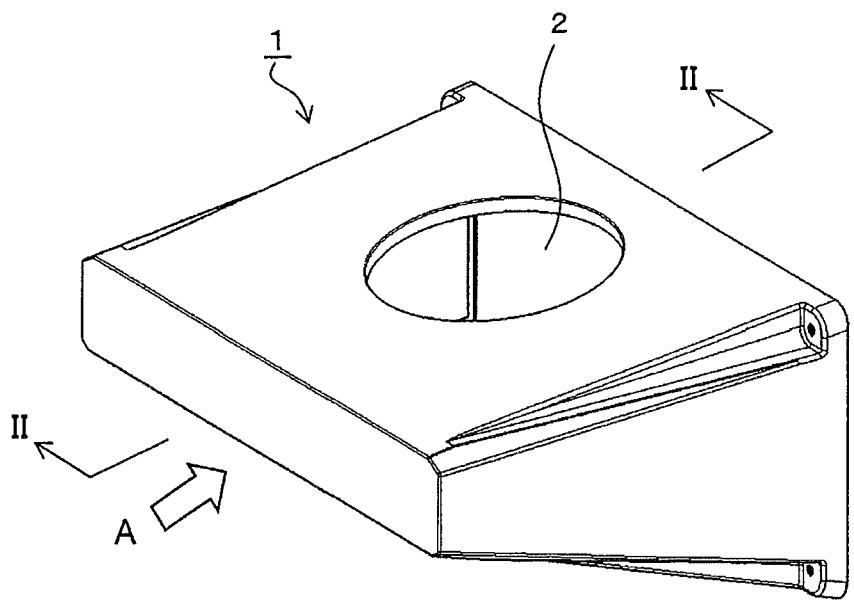
FIG. 1 is a schematic perspective view of an energy-absorbing member according to an example.

1: energy-absorbing member
2: opening
3: member structural part
4: plurality of fiber reinforced resin layers
5: core material
A: external-loading direction

DETAILED DESCRIPTION

We provide an energy-absorbing member having a structure in which a plurality of fiber reinforced resin layers are layered in a thickness direction of the member and includes, as the plurality of fiber reinforced resin layers, at least a plurality of unidirectional materials each comprising unidirectionally aligned reinforcing fibers and a resin and a plurality of cross materials each comprising a reinforcing fiber woven fabric and a resin, and is characterized in that lengths of the plurality of unidirectional materials in an external-loading direction are sequentially changed.

In such an energy-absorbing member, by including a plurality of cross materials each comprising a reinforcing fiber woven fabric and a resin, the strength and rigidity of the entire member can be easily secured and the member can be easily formed in a desired outward shape. Further, by including a plurality of unidirectional materials each comprising unidirectionally aligned reinforcing fibers and a resin, since it becomes possible to make the unidirectional materials function as propping-up materials against the extension direction of the reinforcing fibers, it can be prevented to cause a buckling or a collapse, or a deformation close thereto, at the time immediately after an impact force is input and, because the mode can be transferred to a sequential breakage after a high load is maintained, it becomes possible to exhibit a high energy absorption property. Then, because the lengths of the plurality of unidirectional materials in an external-loading direction are sequentially changed, the plurality of unidirectional materials receive the external load substantially in order. As a result, energy is smoothly absorbed against the external load being input without causing a rapid fluctuation and, by adjusting the layering number, the positions of the disposition, the respective changed lengths and the like of the plurality of unidirectional materials, it becomes possible to easily adjust and set a desired energy absorption quantity. In other words, in the energy-absorbing member, it becomes possible to easily adjust and set an optimum energy absorption quantity only by adjusting the layering number of the plurality of unidirectional materials, the positions of the disposition of the respective layers, the lengths of the respective layers and the like.

In the above-described energy-absorbing member, it is preferred that a length of a unidirectional material located at a more inner-layer side in the thickness direction of the member is set shorter than a length of a unidirectional material located at a more outer-layer side. In such a structure, the buckling or collapse of the respective unidirectional materials progresses from a more outer-layer side of the member and, for example, when an incorporated component such as another component or a harness is contained in the energy-absorbing member, it becomes possible to adequately protect the incorporated component until the entire energy-absorbing member is greatly deformed.

Further, it is preferred that the directions to align reinforcing fibers of the above-described plurality of unidirectional materials are all set in the external-loading direction. In such a structure, it becomes possible to make all the unidirectional materials function as propping-up materials against the extension direction of the reinforcing fibers, it becomes possible to make the respective unidirectional materials exhibit energy-absorbing functions securely in a predetermined order as the external load being input becomes greater, a more smooth energy absorption becomes possible, and the energy quantity to be absorbed can be adjusted and set at a target value more securely.

Further, it is preferred that each of the above-described unidirectional materials is layered at a condition being put between the cross materials. In such a structure, it becomes possible to maintain formation of the unidirectional material before progress of buckling or a collapse at a stable formation by the adjacent cross materials, thereby exhibiting a stable target energy absorption property.

Further, it is preferred that carbon fibers having a tensile elastic modulus of 290 GPa or more are used as reinforcing fibers of the above-described plurality of unidirectional materials. More preferably, it is desired that carbon fibers having a tensile elastic modulus of 430 GPa or more are used. By using carbon fibers having such a high elastic modulus, it becomes possible to impart high energy absorption properties to the respective unidirectional materials themselves, and an excellent energy absorption property is imparted to the entire energy-absorbing member.

Further, in the energy-absorbing member, a structure can also be employed wherein a core material is interposed at any part of the layered structure of the above-described plurality of fiber reinforced resin layers. As the core material, a core material light in weight comprising a foamed resin material, an aluminum honeycomb and the like can be used. In such a sandwich structure, because it is possible to increase the flexural stiffness or increase the thickness, a buckling or a collapse, or a deformation close thereto, when input with a higher impact force, can be prevented and, therefore, even when a high impact force is input, while an adequate energy absorption property can be exhibited, lightness in weight of the entire energy-absorbing member can be satisfied.

Further, a formation can also be employed wherein, as the above-described plurality of cross materials, a cross material including a reinforcing fiber woven fabric with orientation angles of reinforcing fibers of 0°/90° relative to the above-described external-loading direction and a cross material including a reinforcing fiber woven fabric with orientation angles of reinforcing fibers of ±45° relative to the external-loading direction are provided. In such a formation, it becomes possible to impart adequate strength and rigidity to the energy-absorbing member with respect to nearly all directions by disposing the cross materials and, in particular, by disposing the cross material including a reinforcing fiber woven fabric with orientation angles of ±45°, it becomes possible to adequately set also the torsional rigidity and the torsional strength of the member and, therefore, it becomes possible to design an optimum energy-absorbing member more easily.

Further, a formation is also preferred wherein cross materials are disposed as an outermost layer and an innermost layer of the above-described plurality of fiber reinforced resin layers layered in the thickness direction of the member. From the viewpoint that it is believed that generally the own formation maintaining property of the cross material including a reinforcing fiber woven fabric is higher than that of the unidirectional material including unidirectionally aligned reinforcing fibers, by forming the fiber reinforced resin layers forming the outermost and innermost layers not by the unidirectional materials but by the cross materials, the maintaining of a desirable formation of the entire energy-absorbing member can be achieved more easily and more securely.

In this case, a formation is also preferred wherein a fiber reinforced resin layer that forms a design surface is further disposed outside the cross material of the outermost layer. As the fiber reinforced resin layer that forms a design surface, for example, a type having a narrow strand width that forms a cross material among cross materials is preferred from the viewpoint of shape formation property and the like. Further, a fiber reinforced resin layer comprising a reinforcing fiber mat layer arranged randomly with reinforcing fibers and a resin may be used. In such a surface layer of the fiber reinforced resin layer, because a function of sharing the strength or rigidity of the entire energy-absorbing member is substantially not required, it may be selected only from the viewpoint of obtaining a desirable appearance.

Furthermore, we provide a method of producing the above-described energy-absorbing member. Namely, provided is a method of producing an energy-absorbing member comprising a step of layering a plurality of fiber reinforced resin layers in a thickness direction of the member, the plurality of fiber reinforced resin layers including at least a plurality of unidirectional materials each comprising unidirectionally aligned reinforcing fibers and a resin and a plurality of cross materials each comprising a reinforcing fiber woven fabric and a resin, characterized in that the plurality of unidirectional materials are layered changing lengths of the plurality of unidirectional materials in an external-loading direction sequentially.

Thus, in the energy-absorbing member and the production method thereof, by changing the lengths of the plurality of unidirectional materials in an external-loading direction sequentially, it becomes possible to smoothly absorb the energy without causing a rapid fluctuation and, by adequately adjusting the layering number, the positions of the disposition, the respective changed lengths and the like of the respective unidirectional materials, it becomes possible to adjust and set the energy absorption quantity of the energy-absorbing member at a target desirable value easily and substantially freely. As a result, for example, an optimum design of an energy-absorbing member in accordance with the weight of a vehicle body and the like can be performed easily and securely without greatly changing the outward shape of the member.

Hereinafter, examples will be explained referring to the figures.

Figure 2:
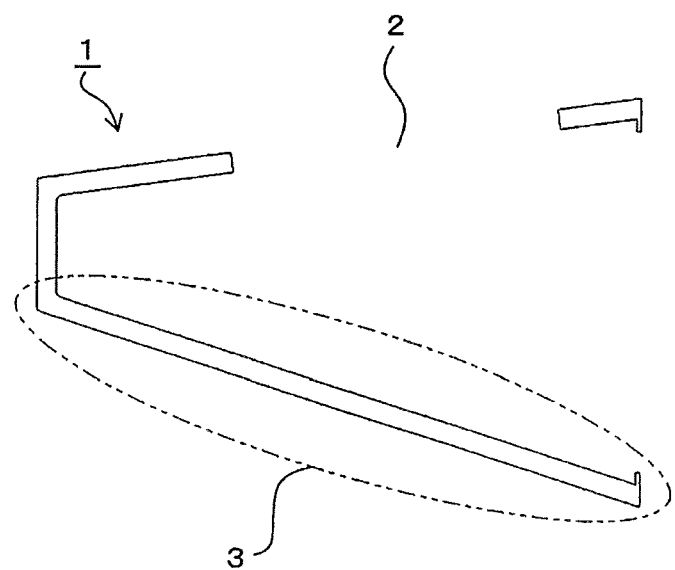
FIG. 2 is a vertical sectional view of the energy-absorbing member as viewed along line II-II of FIG. 1.

FIGS. 1 and 2 show an energy-absorbing member 1 according to an example and, specifically, show an energy-absorbing member 1 provided to a front part in an engine compartment in a front part of a vehicle to absorb energy at the time of a front collision or the like. Energy-absorbing member 1 is formed as a box-type member having a trapezoid shape with a top side formed by the front portion side as viewed from the side direction, and the rear portion side forming a bottom side of the trapezoid shape is opened rearward. This energy-absorbing member 1 is formed to be able to contain another component therein as needed, and an opening indicated by symbol 2 shows an opening 2 to access a harness or the like for the other component. Because a load applied from the front portion side is input in a front collision, the arrow A direction is set as an external-loading direction.

Each portion of such an energy-absorbing member 1 has a structure in which a plurality of fiber reinforced resin layers are layered in the thickness direction of the member and, as the plurality of fiber reinforced resin layers, the energy-absorbing member 1 includes at least a plurality of unidirectional materials each comprising unidirectionally aligned reinforcing fibers and a resin and a plurality of cross materials each comprising a reinforcing fiber woven fabric and a resin, and the lengths of the plurality of unidirectional materials in the external-loading direction A are sequentially changed. As the reinforcing fibers of the respective fiber reinforced resin layers, use of carbon fibers is preferred from the viewpoint of maintaining the strength and rigidity of the entire member high and making the member exhibiting an excellent energy absorption property. As the matrix resins of the respective fiber reinforced resin layers, any of a thermoplastic resin and a thermosetting resin can be used. With respect to the structure of the above-described plurality of unidirectional materials and the plurality of cross materials, exemplifying a member structural part 3 shown in FIG. 2, a concrete layering structure will be exemplified in FIG. 3 and the following Table 1.

As shown in FIG. 3, this part 3 is formed by a plurality of fiber reinforced resin layers 4 layered in the thickness direction of the member and, in an approximately central portion of the layering structure, a core material 5 comprising a light member is interposed.

In FIG. 3 and Table 1, a material added with "W" to the material to form a fiber reinforced resin layer represents a cross material comprising a reinforcing fiber woven fabric and a resin, a material added with "UD" represents a unidirectional material comprising unidirectionally aligned reinforcing fibers and a resin, and all of these materials are shown by the stock numbers of the materials to form fiber reinforced resin layers supplied by Toray Industries, Inc. A material added with "FA" indicates a film type adhesive. The alignment directions of reinforcing fibers of the respective unidirectional materials are all set in the above-described external-loading direction A (0° direction in Table 1). In particular, as these unidirectional materials, "UD M46J" (unidirectional material supplied by Toray Industries, Inc., using high elastic modulus carbon fibers having a tensile elastic modulus of 430 GPa as reinforcing fibers) is used. In these unidirectional materials, the lengths thereof in the external-loading direction are changed sequentially as shown in FIG. 3 and, in particular, in the example shown in FIG. 3, the positions of the tip portions in the external-loading direction (the positions of vehicle front side tip portions in the external-loading direction) are changed sequentially. The unit of the respective dimensions exemplified in FIG. 3 is "mm".

The example shown in FIG. 3 and Table 1 is an example of a layering structure, and our members are not limited to this example.

TABLE 1

| No. | Material | Angle | Thickness (mm) |
|---|---|---|---|
| PLY 1 | W245 T300 | 0/90 | 0.25 |
| PLY 2 | W380 T700 | ±45° | 0.4 |
| PLY 3 | UD M46J | 0° | 0.15 |
| PLY 4 | W380 T700 | ±45° | 0.4 |
| PLY 5 | W380 T700 | 0/90 | 0.4 |
| PLY 6 | W380 T700 | ±45° | 0.4 |
| PLY 7 | UD M46J | 0° | 0.15 |
| PLY 9 | W380 T700 | 0/90 | 0.4 |
| F. A 1 | FA225 | | |
| CORE | C12.7 | | 12.7 |
| F. A 3 | FA225 | | |
| PLY 12 | W380 T700 | 0/90 | 0.4 |
| PLY 13 | W380 T700 | ±45° | 0.4 |
| PLY 14 | UD M46J | 0° | 0.15 |
| PLY 15 | W380 T700 | ±45° | 0.4 |
| PLY 16 | Vt380 T700 | 0/90 | 0.4 |
| PLY 17 | W380 T700 | ±45° | 0.4 |
| PLY 18 | UD M46J | 0° | 0.15 |
| PLY 19 | W380 T700 | ±45° | 0.4 |
| PLY 20 | W360 T700 | 0/90 | 0.4 |

By employing the layering structure as shown in FIG. 3 and Table 1, as aforementioned, since the lengths of the plurality of unidirectional materials in the external-loading direction are sequentially changed, the plurality of unidirectional materials receive the external load substantially in order, the energy is smoothly absorbed without causing a rapid fluctuation, and by adjusting the layering number, the positions of the disposition, the respective changed lengths and the like of the respective unidirectional materials, it becomes possible to adjust and set the energy absorption quantity easily at an optimum energy absorption quantity without greatly changing the outward shape of the member.

Further, by employing unidirectional materials using high elastic modulus carbon fibers as the respective unidirectional materials to be layered, it becomes possible to impart high energy absorption properties to the respective unidirectional materials themselves, and exhibit an excellent energy absorption property as the whole of the energy-absorbing member. Further, in the example shown in FIG. 3 and Table 1, since a fiber reinforced resin layer (PLY1, W245 T300) to form a design surface is further disposed outside the outermost layer (PLY2) of the cross material (W380 T700), a desirable appearance can also be obtained.

INDUSTRIAL APPLICABILITY

The energy-absorbing member can be applied to any field which requires absorption of an impact energy and the like, and in particular, it is suitable as an energy-absorbing member provided at a front portion of a vehicle.

The invention claimed is:
1. An energy-absorbing member having a structure in which a plurality of fiber reinforced resin layers are layered in a thickness direction of said member and including as said plurality of fiber reinforced resin layers, at least a plurality of unidirectional materials each comprising unidirectionally aligned reinforcing fibers and a resin and a plurality of cross materials each comprising a reinforcing fiber woven fabric and a resin, wherein lengths of said plurality of unidirectional materials in an external-loading direction are sequentially changed, a length of a unidirectional material located at a more inner-layer side in said thickness direction of said member is shorter than a length of a unidirectional material located at a more outer-layer side, and each of said unidirectional materials is layered at a condition between said cross materials.

2. The energy-absorbing member according to claim 1, wherein directions to align reinforcing fibers of said plurality of unidirectional materials are all in said external-loading direction.

3. The energy-absorbing member according to claim 1, wherein carbon fibers having a tensile elastic modulus of 290 GPa or more are used as reinforcing fibers of said plurality of unidirectional materials.

4. The energy-absorbing member according to claim 1, wherein a core material is interposed at any part of said layered structure of said plurality of fiber reinforced resin layers.

5. The energy-absorbing member according to claim 1, wherein, as said plurality of cross materials, a cross material including a reinforcing fiber woven fabric with orientation angles of reinforcing fibers of 0°/90° relative to said external-loading direction and a cross material including a reinforcing fiber woven fabric with orientation angles of reinforcing fibers of ±45° relative to said external-loading direction are provided.

6. The energy-absorbing member according to claim 1, wherein cross materials are disposed as an outermost layer and an innermost layer of said plurality of fiber reinforced resin layers layered in said thickness direction of said member.

7. The energy-absorbing member according to claim 6, wherein a fiber reinforced resin layer that forms a design surface is further disposed outside said cross material of said outermost layer.

8. The energy-absorbing member according to claim 2, wherein carbon fibers having a tensile elastic modulus of 290 GPa or more are used as reinforcing fibers of said plurality of unidirectional materials.

9. The energy-absorbing member according to claim 2, wherein a core material is interposed at any part of said layered structure of said plurality of fiber reinforced resin layers.

10. The energy-absorbing member according to claim 3, wherein a core material is interposed at any part of said layered structure of said plurality of fiber reinforced resin layers.

11. An energy-absorbing member having a structure in which a plurality of fiber reinforced resin layers are layered in a thickness direction of said member and including as said plurality of fiber reinforced resin layers, at least a plurality of unidirectional materials each comprising unidirectionally aligned reinforcing fibers and a resin and a plurality of cross materials each comprising a reinforcing fiber woven fabric and a resin, wherein lengths of said plurality of unidirectional materials in an external-loading direction are sequentially changed, a length of a unidirectional material located at a more inner-layer side in said thickness direction of said member is shorter than a length of a unidirectional material located at a more outer-layer side, directions to align reinforcing fibers of said plurality of unidirectional materials are all in said external-loading direction, and each of said unidirectional materials is layered at a condition between said cross materials.

* * * * *

UNITED STATES PATENT AND TRADEMARK OFFICE
CERTIFICATE OF CORRECTION

| | | |
|---|---|---|
| PATENT NO. | : 9,644,700 B2 | |
| APPLICATION NO. | : 14/423752 | |
| DATED | : May 9, 2017 | |
| INVENTOR(S) | : Wakabayashi et al. | |

It is certified that error appears in the above-identified patent and that said Letters Patent is hereby corrected as shown below:

In the Specification

<u>In Column 6</u>
At TABLE 1, in the heading "Material" at No. PLY 16, please change "Vt380" to -- W380 --; and at No. PLY 20, please change "W360" to -- W380 --.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*